(12) United States Patent
Cameron et al.

(10) Patent No.: US 7,230,746 B2
(45) Date of Patent: Jun. 12, 2007

(54) 3D DISPLAY

(75) Inventors: Colin D Cameron, Malvern (GB); Christopher W Slinger, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 10/415,957

(22) PCT Filed: Nov. 2, 2001

(86) PCT No.: PCT/GB01/04855

§ 371 (c)(1),
(2), (4) Date: May 7, 2003

(87) PCT Pub. No.: WO02/39192

PCT Pub. Date: May 16, 2002

(65) Prior Publication Data

US 2004/0042161 A1    Mar. 4, 2004

(30) Foreign Application Priority Data

Nov. 7, 2000    (GB) ................................ 0027103.1

(51) Int. Cl.
G03H 1/08    (2006.01)
G03H 1/00    (2006.01)
G03H 1/26    (2006.01)

(52) U.S. Cl. ................................ 359/9; 359/1; 359/23
(58) Field of Classification Search ............... 359/1, 359/9, 32, 564, 15, 22, 35, 23
See application file for complete search history.

(56) References Cited

U.S. PATENT DOCUMENTS 3,957,353 A * 5/1976 Fienup et al. ............... 359/564
4,701,006 A    10/1987 Perlmutter
5,426,521 A *  6/1995 Chen et al. ..................... 359/9
5,483,364 A *  1/1996 Ishimoto et al. ............... 359/9
5,852,504 A * 12/1998 Kato et al. ..................... 359/9

FOREIGN PATENT DOCUMENTS

EP    0 880 110 A    11/1998
WO    99/19767 A     4/1999

OTHER PUBLICATIONS

Lucente; "Holographic Bandwidth Compression Using Spatial Subsampling"; Optical Engineering, SOC. of Photo-Optical Instrumentation Engineers, Bellingham, US, vol. 35, No. 6, Jun. 1, 1996, pp. 1529-1537, XP000630859.
M. Lucente, "Diffraction-Specific Fringe Computation for Electro-Holography" Doctoral Thesis Dissertation, MIT Dept. of Electrical Engineering and Computer Science, Sep. 1994.

* cited by examiner

Primary Examiner—Audrey Chang
(74) Attorney, Agent, or Firm—Marger Johnson & McCollom, P.C.

(57) ABSTRACT

A method of generating a Computer Generated Hologram (CGH) using the diffraction specific algorithm allows a curved wavefront to be produced from a single hogel, rather than the planar waves of the prior art. This allows a wavefront from a singel hogel to generate a point in the image volume. An imaginary wavefront is transmitted from each point in the image volume and sampled at a plurality of points over the hogel. These samples are used to produce a set of complex Fourier coefficients that can be used to approximate the original waveform.

13 Claims, 5 Drawing Sheets

Current invention: The hogel can produce curved wavefronts

Plan view

Prior art : Plane waves propagate from the hogel

Current invention : The hogel can produce curved wavefronts

DS1: Point formed by multiple hogels contributing plane waves

DS2: Point formed by single hogel producing a curved wavefront

Fig.10. Intensity around xp, zp = -0.005, 0.75`
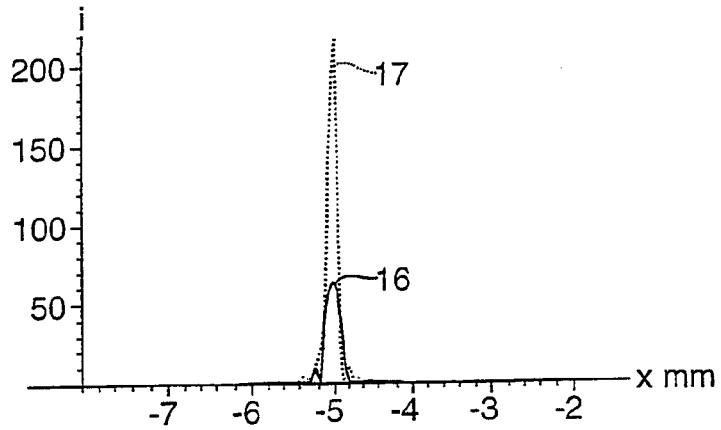
Fig.11a. (prior art)
Aberrating system
(not compensated)
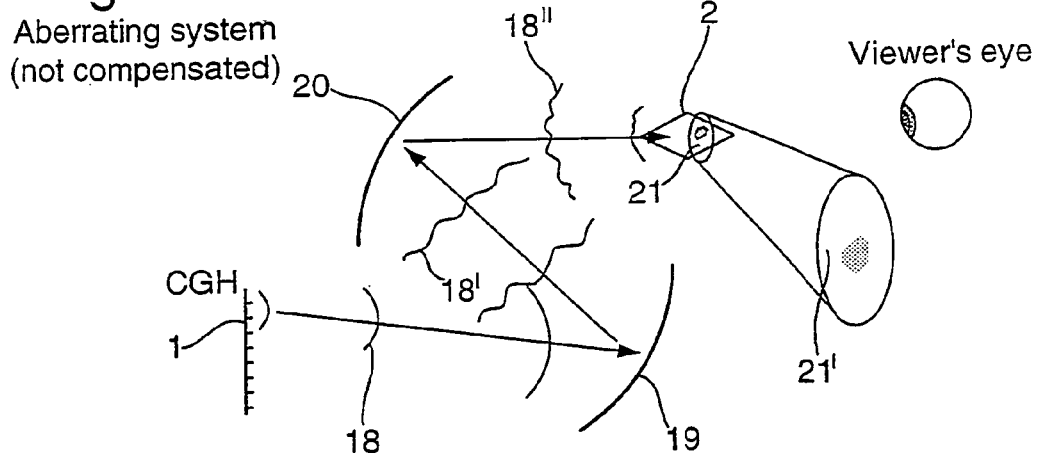
Fig.11b.
Aberration corrected system
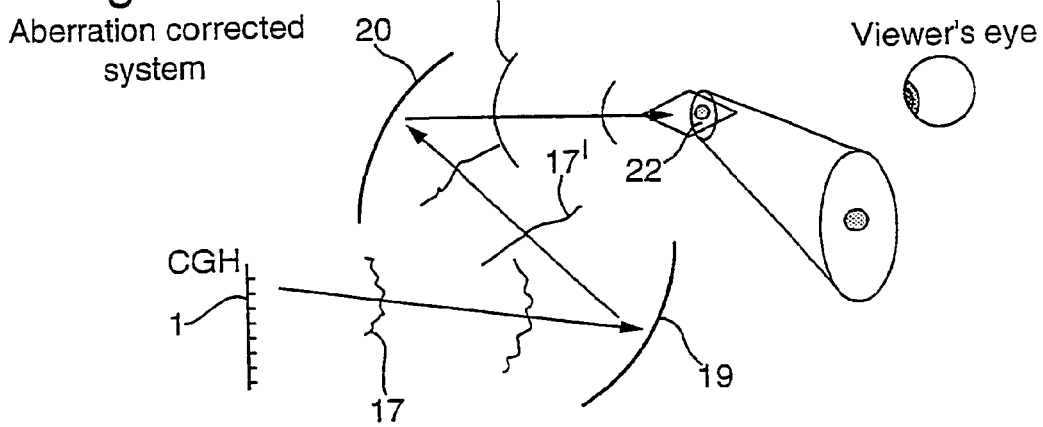

3D DISPLAY

This application is the U.S. national phase of international application PCT/GB01/04855 filed 02 Nov. 2001, which designated the U.S.

This invention relates to improvements to three-dimensional (3D) displays, and their associated image generation means. More specifically, it relates to a way of improving the image quality of Diffraction Specific computer generated holograms (CGH) by means of a novel way of representing and calculating data relating to the image.

Introduction

Holographic displays can be seen as being potentially the best means of generating a realistic 3D image, as they provide depth cues not available in ordinary two dimensional displays or many other types of 3D display. The accommodation depth cue, for example, is a cue that the brain receives when a viewer's eye focuses at different distances and is important up to about 3 meters in distance. This is, of course a cue that is used when looking at real objects, but of the 3D display technologies currently available, only true holograms provide 3D images upon which the eye can use its accommodation ability. It is a desire to be able to produce reconfigurable holographic displays electronically, such that an image can be generated from computer held data. This gives flexibility to produce holographic images of existing objects or non-existent objects without needing to go through the time consuming and expensive steps normally associated with their production.

Unfortunately, producing such an image electronically is extremely challenging. Methods exist, however, for just such generation, but they currently require a large amount of computing time, and specialised display hardware.

One such method of computing a CGH is to use what is known as the Diffraction Specific (DS) algorithm. A DS CGH is a true CGH (as opposed to a holographic stereogram variant) but has a lower computational load than Interference Based true CGH algorithms. The reason for this is that the DS algorithm is currently the most effective in terms of controlling the information content of CGH and avoiding unnecessary image resolution detail that cannot be seen by the human eye.

A key concept of the DS algorithm is the quantisation of the CGH in both the spatial and spectral domains. This allows control of the amount of data, or the information content of the CGH, that in turn reduces the computational load. The CGH is divided up into a plurality of areas, known as hogels, and each hogel has a plurality of pixels contained within it. The spatial frequency spectrum of each hogel is quantised such that a hogel has a plurality of spatial frequency elements known as hogel vector elements.

There are problems with this method however. The current method is subject to a large number of constraints.

The system constraints that are present using the methods of the prior art are:

a) Plane waves from more than 1 hogel must enter the eye pupil. This provides a constraint on the hogel aperture. Therefore, if the hogel is smaller then light from more of them can enter the eye.

b) The number of lateral image volume points (and therefore the number of hogel vector components) must not exceed the number of pixels in a hogel divided by 2. This means that a large number of pixels per hogel is needed to give a good quality image.

c) The point spread function (the fineness to which a point can be focussed) of an image volume point is related to the distance the point is from the focal plane and the size of the hogel aperture. A larger hogel will give a sharper focussed point.

d) The achievable-depth resolution is constrained by a large number of interdependent parameters. Most severely this is constrained by the number of hogel vector components which must be large.

e) The above constraints must be satisfied for the minimum eye viewing distance. (The nearer the eye is to the image volume, the tougher the constraints).

Statement of Invention

According to the present invention there is provided a computer generated holographic display comprising at least a light diffraction plane notionally divided into a plurality of hogels, an image volume space and image calculation means, wherein image data is created by the steps of for each point in the image volume, a wavefront is mathematically projected from the point to each hogel through any display optics that may be present;

the wavefront arriving at each hogel is sampled at a plurality of points across the hogel;

the wavefront is approximated into a set of spatial frequency coefficients, which are stored in memory;

the coefficients are used to produce a diffraction pattern across the hogel such that light diffracted by the hogel produces a curved wavefront, this wavefront going on to produce at least one point in the image volume.

The present invention allows each hogel in the system to generate curved waveforms, as opposed to the plane waves as generated in the prior art. It does this by sampling an imaginary wavefront coming from each point in the 3D volume at a plurality of points over the hogel, as opposed to the single point of the prior art. These samples are used to produce a set of complex Fourier coefficients that can be used to approximate the original waveform.

Each hogel has contained within it a plurality of pixels. The dimensions of the hogel, in terms of pixels, defines certain properties of the 3D image that is produced by the system. A full parallax system allows a viewer of the projected image to "see around" the image both horizontally and vertically. This type of system would have hogels that have a plurality, of pixels in two dimensions. To cut down on the computation time involved with displaying these images however, it is often acceptable from a system point of view to display images having horizontal parallax only (HPO). This restricts the viewer of an image to being able to look around it in one plane only—the horizontal one in this case. In this case, a hogel will be only one pixel high, but more than one pixel wide. The current invention is equally applicable to both systems. The dimensions of the hogels will be different, and the HPO system will save on computing power as the processing required for each hogel is only one dimensional, and cylindrical as opposed to spherical coordinates may be used. Anamorphic optics can also be used to replay such a hologram.

Assume that a given hogel has n pixels across its width. The number, m, of Fourier components used to represent the wavefront is limited to $0 \leq m \leq n/2$ to avoid undersampling of the wavefront and loss of information. These m coefficients represent the magnitude of the first m possible grating frequencies in the hogel, and are the hogel vector components that are stored in the diffraction table.

It will be understood by those skilled in the art that the present invention can be used in display systems that comprise either Fourier optics or Fresnel optics.

As another aspect of the invention there is provided a method of producing a computer generated hologram on a display comprising at least a light diffracting panel notionally divided into a plurality of hogels, and image calculation means, where the method comprises the steps of for each point in the image volume, mathematically projecting a wavefront from the point to each hogel;

sampling the wavefront at each hogel at a plurality of points across the hogel;

approximating the wavefront into a set of spatial frequency coefficients, which are stored;

producing a diffraction pattern across the hogel using the coefficients such that light diffracted by the hogel produces a curved wavefront, this wavefront going on to produce at least one point in the image volume.

As a further aspect of the invention there is provided a method of correcting for known aberrations present in the optical system of a computer generated hologram display system comprising an image volume and a light diffraction panel notionally divided up into a plurality of hogels, wherein:

a first wavefront is mathematically projected from a point in the image volume through the optical system to a hogel, the wavefront being distorted by any aberrations in the optical system;

the distortions added to the first wavefront by the optical system are used to generate a real, pre-distorted second wavefront emanating from the hogel, such that as the second wavefront passes through the distorting optics the pre-distortions on the second wavefront are removed.

It will be seen that providing a curved wavefront from each hogel enables known defects or aberrations in the optical system to be corrected or reduced. Should a spherical wave, as emanated from a point P in the image volume arrive at a particular hogel with distortions due to imperfections in the optical system, then the wavefront that is transmitted in a real system from the hogel to the point P can be "pre distorted" such that when it arrives at the point the pre distortions and the actual distortions present in the system cancel each other out.

The distortions present in a particular system need only be measured or calculated once, and the data so obtained can be stored for later use with any image to be displayed. The distortion information is used to compute a pre-compensation in the diffraction table and is stored as more-advanced form of diffraction table. Patent application WO 00/75733 provides a full description of correcting aberrations by distorting the wavefront. The current invention provides a particularly efficient means with which such an aberration correction method may be implemented, as the information regarding the required pre-distortions is stored in the-diffraction table, and the calculations are hence done off-line.

Typically, the light diffraction plane, or CGH, will comprise of a spatial light modulator, but any device capable of being addressed with a diffraction pattern may be used.

The current invention may be implemented as a computer program running on a computer system. The program may be stored on a carrier, such as a hard disk system, floppy disk system, or other suitable carrier. The computer system may be integrated into a single computer, or may contain distributed elements that are connected together across a network.

DETAILED DESCRIPTION AND DRAWINGS

The current invention will now be described in detail, by way of example only, with reference to the following diagrams, in which FIG. 1 illustrates in diagrammatic form the geometry of the CGH replay optics.

FIG. 10 shows a calculated point spread function for a hogel containing 500 pixels and subjected to certain constraints.

FIG. 11a illustrates in diagrammatic form the distortions that can arise in a practical system, and FIG. 11b illustrates in diagrammatic form how, by pre-distorting a waveform from a hogel, these distortions can be compensated for.

Figure 1:
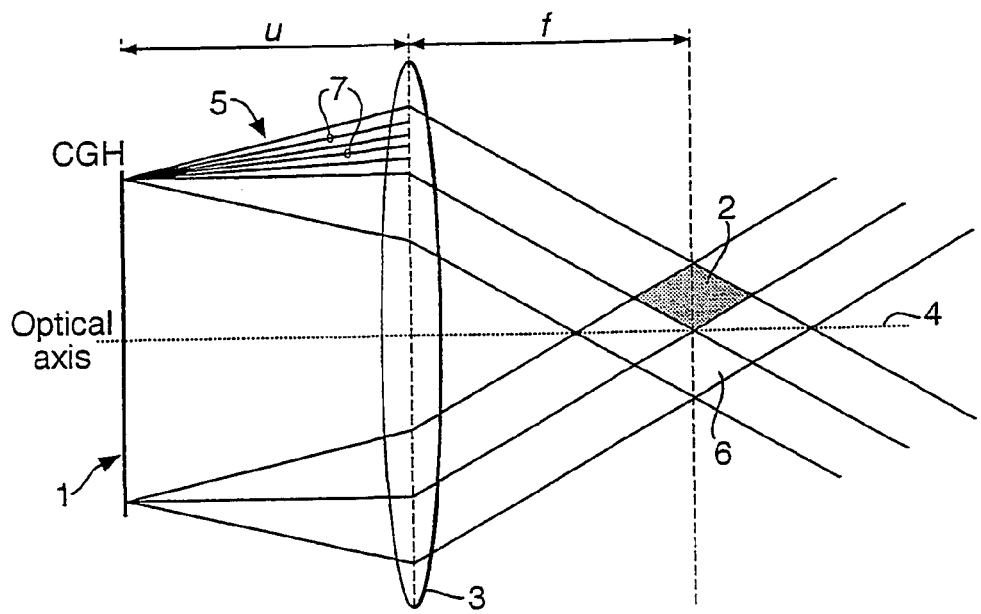

A person skilled in the art will realise that computer generated holograms are displayed on a panel capable of being programmed to diffract light in a controlled manner. This panel is usually a spatial-light modulator, but for the purposes of this invention can be anything suitable. Note that the term "diffraction panel" is used to describe this panel in this specification before diffraction information is written to it, although-once the diffraction panel is written with diffraction information, it can be interchangeably termed a CGH.

The skilled person will also realise that the DS algorithm comprises the following stages.

The 3D image is made up by the diffraction of light from the hogels. The diffraction process sends light from one of the hogels in a number of discrete directions, according to which basis fringes are selected, as described below. A basis fringe represents part of the hogel vector spectrum, and when many basis fringes are accumulated into a hogel a continuous spectrum is formed.

The basis fringes are calculated once for a given optical geometry, and are independent of the actual 3D image to be displayed. They can therefore be calculated offline, before the CGH is calculated and displayed.

A given image must have the correct basis fringes selected in the appropriate hogels in order to properly display the image components. A diffraction table allows this selection to be done correctly. The diffraction table maps locations in the image volume to a given hogel, and to hogel vector components of that hogel. These locations, or nodes, are selected according to the required resolution of the 3D image. More nodes will give a better resolution, but will require more computing power to generate the CGH. Having control of the nodes therefore allows image quality to be traded for reduced processing time. The hogel vector selects and weights which basis fringes are required by a given hogel in order to construct the 3D-image information.

The hogel vectors themselves are generated from data based on the 3D object or scene to be displayed. A geometric representation of the object is stored in the computer system. The geometric information is rendered using standard computer graphics techniques in which the depth map is also stored. The rendering frustum is calculated from the optical parameters of the CGH replay system. The rendered image and the depth map are used to define, in three dimensions, which parts of the 3D object geometry that the given hogel must reconstruct. A-hogel vector can then be calculated from a combination of this information and the diffraction table to produce the hogel vector.

Finally, to produce the full CGH, the hogel vectors are used to select the appropriate basis fringes needed to makeup the image. The hogel vector is decoded by accumulating the appropriate basis fringes into the hogel. This is a linear process and is repeated for each hogel vector element. The result is a complete hogel that is part of the final CGH.

Note that the wavelength of the light used to read the resultant hologram is a parameter to be considered when calculating the hogel vector components that are stored in the diffraction table. Although current embodiments are based on only a single wavelength being used, that wavelength may be anything suitable for a given application. Off-line recalculation of the diffraction table is all that is necessary if the wavelength needs to be changed. The diffraction table can be enlarged to include hogel vector components that are calculated for more than one wavelength simultaneously. In this way, the system is able to quickly change between different readout wavelengths, or to create holograms for multiple wavelength readout.

More details of this procedure can be found in refs. 1, 2, 3 and 4, which are included in this specification by reference.

FIG. 1 illustrates the replay optics of a general CGH system, including a system capable of implementing the current invention. The diffraction panel 1 is shown transmitting a set of plane waves 7, encompassed by a diffraction cone 5 through a Fourier lens 3, where the waves 7 get refracted towards an image volume 2. It can be seen that the extent of diffraction of the plane waves, given by the cone 5 defines the size of the image volume 2. As the diffracted waves 7 radiate symmetrically from the diffraction panel 1, a conjugate image volume 6 is also formed adjacent the image volume 2. FIG. 1 only shows plane waves 7 radiating from one area of the panel 1, but of course in practice, each hogel on the panel 1 will be radiating such waves. If the diffraction panel 1 is written correctly with appropriate basis fringe data for a given hologram, a viewer in the viewing zone 4 will see a true 3D image in the image volume 2, and the image conjugate in the volume 6. In practice, the conjugate image volume 6 is usually masked out.

The distance of separation between the Fourier lens 3 and the diffraction panel 1 is kept as short as possible to simplify the processing. The steps involved in calculating the hogel vector components as shown below assume that this distance is zero.

Figure 2:
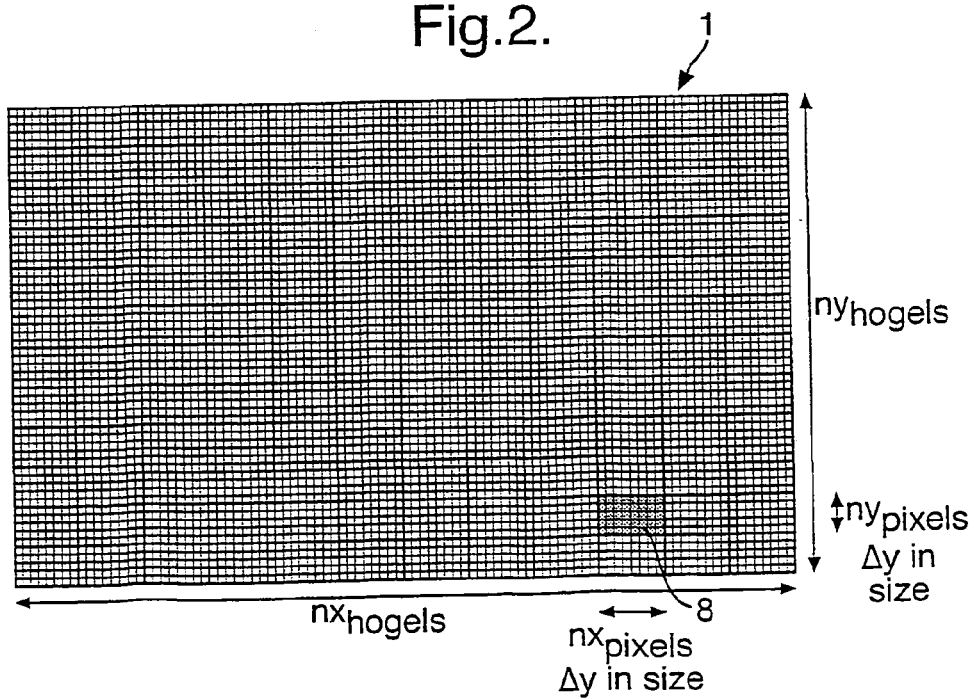
FIG. 2 illustrates in diagrammatic form a CGH showing the division of the area into hogels.

FIG. 2 shows the spatial quantisation of the diffraction panel 1 into a 2D array of hogels. Each hogel (for example 8) is shown having a plurality of pixels in two dimensions. Therefore, a diffraction panel 1 so divided would be suitable for implementing a full parallax system. The number of pixels shown present in each of the hogels (for example 8) is shown figuratively only. In practice there would be approximately 2000 to 4000 pixels in each hogel dimension. In a HPO system, each hogel would have only one pixel in the vertical dimension, but approximately 2000 to 4000 in the horizontal dimension. The current implementation is restricted to a HPO system, to ease computing requirements.

Figure 3:
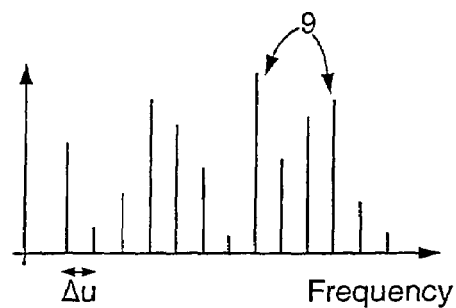
FIG. 3 illustrates in diagrammatic form a typical hogel vector.

FIG. 3 shows the spectral elements 9 of a typical hogel vector that is stored for each hogel. Each component of the vector represents a spatial frequency present in the image as viewed from the hogel in question.

Figure 4:
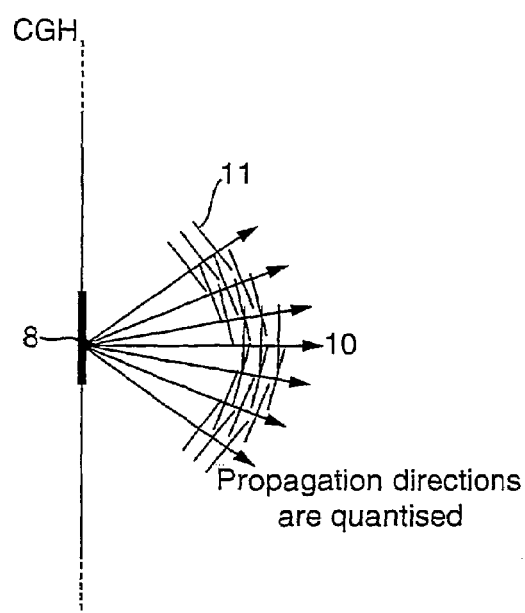
FIG. 4 illustrates in diagrammatic form a series of planar wavefronts emitted from a hogel of the prior art.

FIG. 4 shows light 11 being diffracted from a single hogel in a number of discrete different directions, symmetrical about the normal 10. This is the method of the prior art. The particular angle of diffraction, and hence direction of each of the plane waves 11 is chosen for the particular image that is desired to be displayed in the image volume 2. It is the presence of a particular basis fringe that decides the angle of diffraction of a particular plane wave.

Figure 5:
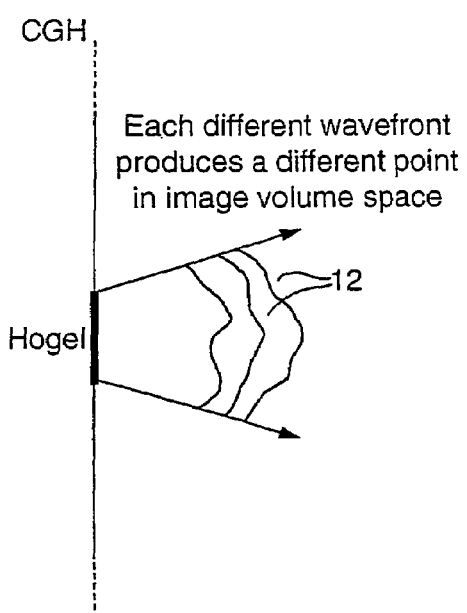
FIG. 5 illustrates in diagrammatic form the curved wavefronts that can be emitted from a hogel of the present invention.

In contrast to FIG. 4, FIG. 5 shows light emanating from a hogel that produces curved wavefronts 12. This is the current invention, and results in an image of better quality. The curved wavefronts 12 are produced by a multiple sampling technique, as discussed later.

Figure 6A:
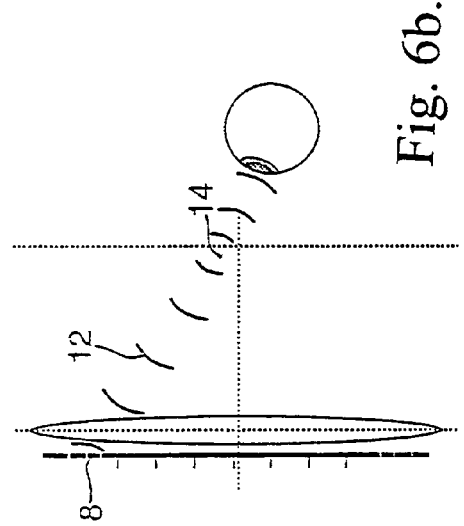
FIG. 6a illustrates in diagrammatic form a point in the image volume being formed using multiple hogels from the prior art, and FIG. 6b also in diagrammatic form a point being formed by a single hogel using the curved wavefronts of the current invention.
Figure 6B:
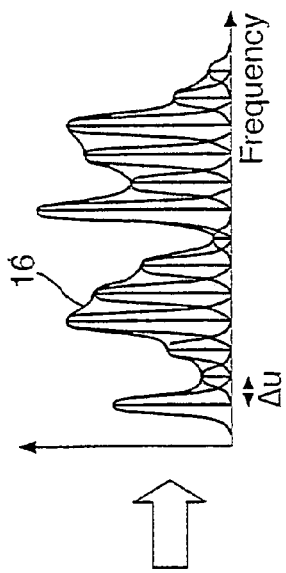

FIGS. 6a and 6b show the different methods in which the optical systems of both the prior art and the present invention display a point in the image volume. Fourier optics are represented, but the idea is equally applicable to other optical arrangements.

In FIG. 6a, the light 11 diffracted from two different hogels 8a, 8b is seen to cross at a point 13, before it goes on to enter the eye of an observer. This observer sees the light as if it emanated from the crossover point 13. In practice, the light emanating from several different hogels, diffracted at several different angles, is required to enter the eye of the observer to build a satisfactory representation of the point 13.

In FIG. 6b, the light pattern from just one hogel 8 is shown. This is a curved wavefront 12 of the current invention. It can be seen that the representation of a point in the image volume is done in a fundamentally different way, as the light from just a single hogel 8 is needed to give an observer the impression of seeing a point 14, as opposed to outputs from multiple hogels with the prior art. Using Fourier optics, a wave 12 as it is emitted from a hogel 8 will, after passing through the Fourier lens 3, be converging on the point 14 before diverging and passing on to the viewer. The viewer will thus see a point from the wavefront emitted from a single hogel. The contribution from the other hogels will also be present, and will add to the image quality.

The result of the invention is that many of the constraints and limitations imposed upon the image by the prior art are eliminated. Previously, the hogel aperture size was constrained by the need to make it smaller so that as many hogels as possible are used to make up the point, but also to make it larger so that the point can be sharply focussed by the eye. Other constraints exist as described above, that are not present in a system of the current invention.

Figure 7:
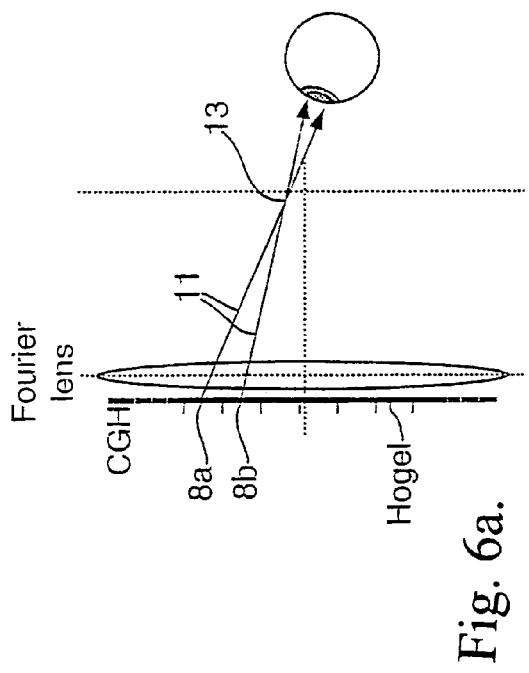
FIG. 7 illustrates in diagrammatic form the process of decoding a hogel vector

FIG. 7 shows the process of decoding a hogel vector to produce a continuous output spectrum. The vector, similar to that shown in FIG. 3, is multiplied with a basis fringe 15 to produce a smooth output spectrum 16 as shown in FIG. 7b. A vector of the present invention will have more coefficients 9 than one of the prior art, as a wavefront is sampled at multiple points across the hogel 8, allowing a hogel to produce curved wavefronts 12 as described below.

Figure 8:
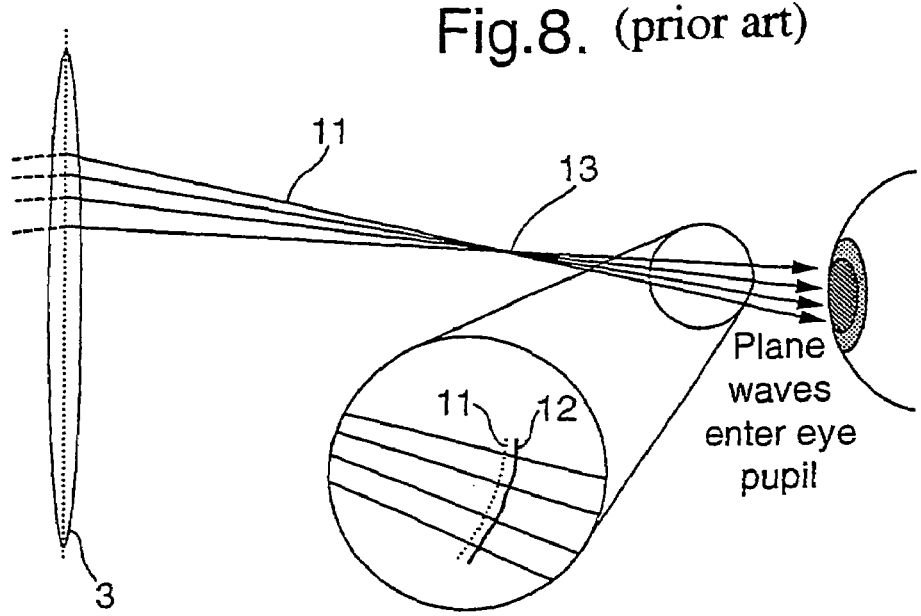
FIG. 8 illustrates in diagrammatic form a system of the prior art using multiple hogels to create an approximation to a curved wavefront.

For clarity, the prior art method of generating an object point 13 is illustrated in FIG. 8. This shows plane waves 11 emanating from four hogels that converge at a point 13 that represents a point in the image volume. These rays 11 go on to diverge, before entering the eye of an observer. This observer will see the waves 11 as a point in space. It will be appreciated that the more plane waves 11 that go on to make the point 13, the more well defined the point 13 will be. This, of course, means that more hogels are required to define a point satisfactorily. It will be recalled from FIG. 5 that only one hogel is needed to define a point in space 14 with the current invention, due to the curved wavefront 12 that can be emanated from it. This changes the constraints on hogel size etc such that a better quality image may be produced.

Figure 9:
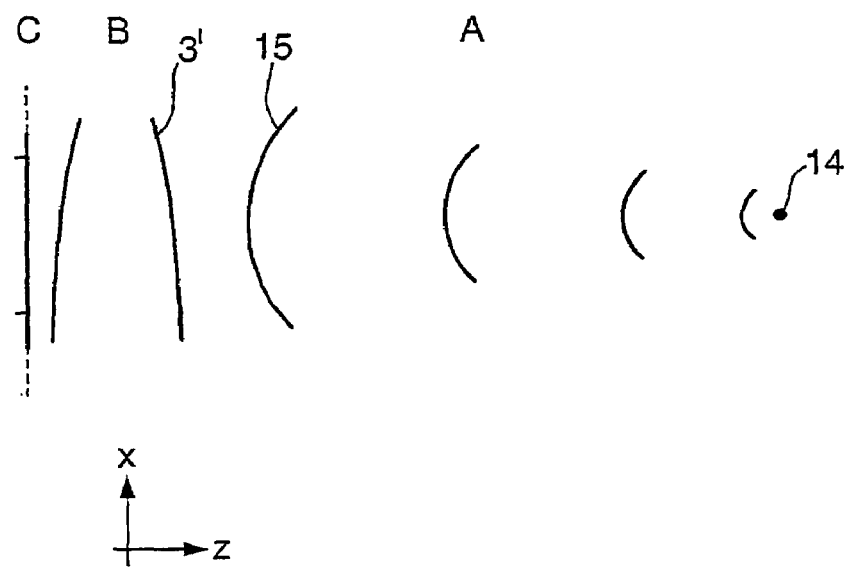
FIG. 9 illustrates in diagrammatic form the principle of the first stage of calculation of the diffraction table.

The multiple point sampling of the wavefront across the hogel is illustrated with the aid of FIG. 9. The first action in the calculation of the hogel vectors of the current invention is to notionally transmit a wavefront from each point in the image volume 3. Consider a point P, 14 coordinates ($X_p, Z_p$) in the image volume. As described above, P is at one of the nodes in the diffraction table (the node spacings can be decided a priori and can be chosen to vary nonlinearly and continuously over a wide range). To calculate the hogel vector components 9 which are associated with the point P, the following procedure can be used, where the optics of the system are assumed to be well approximated by a thin, ideal Fourier lens:

Propagate a spherical wave 15 towards the Fourier transform lens, using P as its source. The form of this (scalar) spherical wave can be described by:

$$\frac{A\exp[ikr]}{r}$$

where $r=\sqrt{(x-x_p)^2+(z-z_p)^2}$ and k is the wave vector magnitude,

A is the point amplitude.

This spherical wave 15 propagates towards the Fourier lens 3' of focal length f. Assume the lens 3' is centred at (x=0, z=0). For the purposes of this example, then lens 3' is approximated as an infinitely thin transparency, having the transmission of:

$$\exp[ik(f-\sqrt{x^2+y^2+f^2})]$$

After propagating through the lens 3', the wavefront at the output of the lens is given by the product of the wavefront falling on the lens and the lens transmission function. If the hogel is not in contact with the lens, a further propagation step needs to be made to calculate the wavefront across the hogel.

The m hogel vector components associated with P can now be calculated. This may be done using an FFT technique or numerical integration technique to determine the first m complex coefficients of the Fourier series of the wavefront.

The theoretical number of spatial frequency components required in each hogel vector is estimated from the rate of change of the wavefront across the hogel. A centrally positioned hogel will have a wavefront across it that has a lower rate of change than a hogel on the extremities of the diffraction panel, where the phase terms of the wavefront will vary much more quickly. As a general rule of thumb, the largest value of m is proportional to $\Phi_{max}/2\pi$, where $\Phi_{max}$ is the maximum phase deviation of the waveform across the hogel. Page 13, amend the paragraph beginning at line 17 as follows:

The diffraction table may therefore be of varying dimensionality. Thus the hogel vectors for the centrally positioned hogels will need fewer spatial frequency components to represent the wavefront than those on the extremity of the diffraction panel. The number of spatial frequency components of the Fourier transform can be reduced if this estimate derived from the paragraph above is lower than half the number of pixels across the hogel, thus saving computing time.

The choice of m also affects the desired object resolution. FIG. 10 shows the theoretical points spread function 16 for m=45, for a hogel containing 500 pixels, spacing 10 wavelengths, and hogel centred at {1.0 mm,0,0}. f=0.5 m, wavelength=500 nm. Also shown is the diffraction limited intensity for the same hogel assuming no wavefront approximations 17. Although the intensity of the two peaks differ, the peak with a reduced number of Fourier components still produces a good quality point localized in space. The different intensities can be compensated for.

FIG. 11a a shows, in a simplified form, the effects on a wavefront being emitted from a system that adds no compensation correction, and in 11b the current invention being used to pre-distort a wavefront to compensate for aberrations present in the optical system. In the following description it is assumed that the wavefronts from the hogel are intended to focus to as sharp a point as possible in the image volume. FIG. 11a shows a wavefront 18 being emitted from a hogel and passing through an optical system comprising two mirrors 19, 20. This system, like all optical systems, will not be perfect, and hence distortions will be introduced. After reflecting from the mirror 19 the wavefront will be distorted, shown as 18'. Further distortions 18' are produced as the wavefront reflects from the mirror 20. These distortions prevent the wavefront from focusing down o a sharp point in the image volume 2. Instead, the "point" 21 has become spread, and less well defined, as can be more clearly seen in the enlarged view 21' of the point 21. FIG. 11b shows how the present invention can correct for the aberrations present in the mirror. As the present invention allows the waveforms emitted from the hogel to be curved in a controlled manner, then the waveform can be pre-distorted with the inverse distortions that are present in the optics. This is shown as the passage of waveform 17. The pre-compensation distortions are present as the waveform is first emitted from the hogel, and these pre-compensation distortions are gradually removed by the aberrations in the optical system. The waveform at 17' is less distorted, and the waveform at 17" less distorted still. This results in the wavefront coming to a much sharper point 22. The invention thus gives control over the desired image quality. The current implementation of the invention is a HPO system, with the light diffraction plane comprising 20 hogels in the horizontal dimension, where each hogel has 1024 pixels. This is capable of providing 512 lateral resolution points across the image volume.

The current invention has been implemented on an Active-Tiling® Computer Generated Hologram display system. The computer system used to produce the CGH can be a standalone unit, or could have remote elements connected by a network.

The Active Tiling system is a means of producing holographic moving images by rapidly replaying different frames of a holographic animation. The Active Tiling system essentially comprises a system for directing light from a light source onto a first spatial light modulator (SLM) means and relaying a number of SLM subframes of the modulated light from the first high speed SLM means onto a second spatially complex SLM. The CGH is projected from this second SLM.

The full CGH pattern is split up into subframes in which the number of pixels is equal to the complexity of the first SLM. These frames are displayed time-sequentially on the first SLM and each frame is projected to a different part of the second SLM. The full image is thus built up on the second SLM over time. The first SLM means comprises an array of the first SLMs that each tile individual subframes on the second SLM over their respective areas.

Light from an SLM in the array must not stray onto parts of the second SLM not intended for it. To prevent this a shutter can be placed between the first SLM means and the second SLM, which masks off those areas of the second SLM that are not currently being written to. Alternatively, electrodes on the second SLM that cover the area where it is not wished to write an image can simply be not provided with a drive voltage. Thus any light that is falling onto the second SLM in these areas has no effect on the modulation layer. This avoids the need for a shutter system. The first SLM of such a system is of a type in which the modulation pattern can be changed quickly, compared to that of the second SLM. Thus its updating frame rate is greater than the read-out frame rate of the second SLM.

The Active Tiling system has the benefit that the image produced at the second SLM, which is addressed at a rate much slower than that of the first SLM array, is effectively governed by the operation of the first SLM. This permits a trade off between the temporal information available in the high frame rate SLMs used in the SLM array and the high spatial resolution that can be achieved using current optically addressed SLMs as the second SLM.

In this way, a high spatial resolution image can be rapidly written to an SLM using a sequence of lower resolution images.

See PCT/GB98/03097 for a full explanation of the active tiling system.

REFERENCES

1. "Diffraction specific fringe computation for electro-holography", M Lucente, Doctoral thesis dissertation, MIT Department of Electrical Engineering and Computer Science, September 1994.
2. "Computational holographic bandwidth compression", M Lucente, IBM Systems Journal, October 1996.
3. Holographic bandwidth compression using spatial sub sampling, M Lucente, Optical Engineering, June 1996.
4. M Lucente, Journal of electronic imaging 2(1), 28–34, January 1993

The invention claimed is:

1. A diffraction specific computer generated holographic display for replay of a hologram into an image volume, said image volume having a plurality of image volume points, said display comprising:
   at least one spatial light modulator (SLM) to which diffraction data is written to produce a diffraction pattern thereon, wherein the diffraction pattern is notionally divided into a plurality of hogels and each hogel is divided into a plurality of points;
   image calculation means for calculating diffraction data which is independent of the image to be displayed, relating each image volume point to each hogel by performing pre-processing steps and for using at least some of said diffraction data in image replay steps, said pre-processing steps comprising the steps of:
     i) calculating a plurality of sample values at a plurality of sample points on each hogel, said sample values representing a calculated curved wavefront radiating from each image volume point to each hogel;
     ii) calculating a set of complex spatial frequency coefficients from the sampled values and storing said set for said image replay steps;
   said image replay steps comprising the steps of
     i) defining a three-dimensional image to be replayed by said display by selection of a sub-set of image volume points; and
     ii) summing a sub-set of said stored set of complex spatial frequency coefficients corresponding to said sub-set of image volume points;
   writing means for writing a diffraction pattern to the corresponding hogel on the SLM calculated from the summed set of spatial frequency coefficients; and
   a light source for illuminating the SLM so as to project curved, real wavefronts from said SLM to said image volume.

2. A computer program product capable of producing a computer generated hologram on a display according to claim 1.

3. A method of producing a diffraction specific computer generated hologram for replay in an image volume, said image volume having a plurality of image volume points, said method utilizing at least one spatial light modulator (SLM) to which diffraction data is written to produce a diffraction pattern thereon, where the diffraction pattern is notionally divided into a plurality of hogels, writing means for writing data to the SLM, a light source for illuminating the SLM, and image calculation means for calculating diffraction data which is independent of the image to be displayed, relating each image volume point to each hogel by performing pre-processing steps and using at least some of said diffraction data in image replay steps, where the method comprises pre-processing steps and image replay steps,
   the pre-processing steps comprising the steps of:
     i) calculating a plurality of sample values at a plurality of sample points in each hogel, said sample values representing an image independent calculated curved wavefront radiating from each image volume point to each hogel;
     ii) calculating a set of complex spatial frequency coefficients from the sampled values and storing said set for said image replay steps; and
   said image replay steps comprising the steps of:
     i) choosing a subset of the image volume points that define a three dimensional image to be replayed;
     ii) summing a sub-set of said stored set of complex spatial frequency coefficients corresponding to said sub-set of image volume points; and
     iii) writing a diffraction pattern to the SLM calculated from the summed, weighted set of spatial frequency coefficients, and
     iv) illuminating the SLM with light from said light source such that the SLM projects a curved wavefront therefrom into said image volume.

4. A method of producing a diffraction specific computer generated hologram as claimed in claim 3, wherein the number of samples in said plurality of sample points in each hogel is changed according to the position of the hogel in the display panel.

5. A method of producing a diffraction specific computer generated hologram as claimed in claim 3, wherein the number of samples in said plurality of sample points in each hogel is changed according to a number proportional to a highest spatial frequency present in said calculated wavefront for said each hogel.

6. A method of producing a diffraction specific computer generated hologram as claimed in claim 3, wherein a fast Fourier transform algorithm is used to approximate the complex spatial frequency components of the calculated wavefront.

7. A method of producing a diffraction specific computer generated hologram as claimed in claim 3, wherein a numerical integration algorithm is used to approximate the complex spatial frequency components of the calculated wavefront.

8. A method of producing a diffraction specific computer generated hologram as claimed in claim 3, wherein a curved real wavefront diffracted from a given hogel is focused to a point after passing through Fourier optics.

9. A method of producing a diffraction specific computer generated hologram as claimed in claim 3, wherein a curved real wavefront diffracted from a given hogel is focused to a point without passing through Fourier optics.

10. A method of producing a diffraction specific computer generated hologram as claimed in claim 3, wherein the image calculation means is arranged to calculate a plurality of image points that together make up an image having full parallax.

11. A method of producing a diffraction specific computer generated hologram as claimed in claim 3, wherein the image calculation means is arranged to calculate a plurality of image points that together make up an image having horizontal parallax only.

12. A computer program product capable of producing a computer generated hologram according to the method of claim 3.

13. A method of producing a diffraction specific hologram as claimed in claim 3, wherein the image calculation means in pre-processing step i) includes the step of accounting for known optical aberrations when calculating the wavefront.

* * * * *